(12) United States Patent
Davis

(10) Patent No.: US 11,912,192 B2
(45) Date of Patent: Feb. 27, 2024

(54) SUPPLEMENTAL VEHICLE ILLUMINATION SYSTEM

(71) Applicant: Adam Michael Davis, Victoria, MN (US)

(72) Inventor: Adam Michael Davis, Victoria, MN (US)

(*) Notice: Subject to any disclaimer, the term of this patent is extended or adjusted under 35 U.S.C. 154(b) by 0 days.

(21) Appl. No.: 16/553,956

(22) Filed: Aug. 28, 2019

(65) Prior Publication Data

US 2021/0061166 A1 Mar. 4, 2021

(51) Int. Cl.
| | |
|---|---|
| *B60Q 1/22* | (2006.01) |
| *B60Q 1/26* | (2006.01) |
| *B60Q 1/46* | (2006.01) |
| *B60R 11/04* | (2006.01) |
| *H04N 23/54* | (2023.01) |
| *H04N 23/74* | (2023.01) |
| *B60R 1/26* | (2022.01) |
| *E01H 5/06* | (2006.01) |
| *B60R 11/00* | (2006.01) |

(52) U.S. Cl.
CPC ............. *B60Q 1/22* (2013.01); *B60Q 1/2657* (2013.01); *B60Q 1/2661* (2013.01); *B60Q 1/2692* (2013.01); *B60Q 1/46* (2013.01); *B60R 1/26* (2022.01); *B60R 11/04* (2013.01); *H04N 23/54* (2023.01); *H04N 23/74* (2023.01); *B60Q 2900/30* (2013.01); *B60R 2011/004* (2013.01); *E01H 5/061* (2013.01)

(58) Field of Classification Search
CPC ...... B60Q 1/22; B60Q 1/2657; B60Q 1/2661; B60Q 1/2692; B60Q 1/46; B60Q 2900/30; B60R 11/04; B60R 1/00; B60R 2011/004; H04N 5/2253; H04N 5/2354; E01H 5/061
USPC ........................................................ 348/148
See application file for complete search history.

(56) References Cited

U.S. PATENT DOCUMENTS

| | | | | |
|---|---|---|---|---|
| 4,084,328 | A * | 4/1978 | Shai ...................... | F21V 21/108 33/391 |
| 9,115,879 | B1 * | 8/2015 | Barker ................ | G09F 13/0409 |
| 2003/0128105 | A1 * | 7/2003 | Shaw ....................... | B60Q 1/22 340/431 |
| 2003/0137840 | A1 * | 7/2003 | Citron ..................... | F21V 21/30 362/427 |
| 2006/0002122 | A1 * | 1/2006 | Griffin ................. | B60Q 1/2611 362/386 |
| 2006/0218835 | A1 * | 10/2006 | Chafin .................... | G09F 21/04 40/611.05 |
| 2007/0065262 | A1 * | 3/2007 | Murphy ................ | B60P 1/4471 414/462 |
| 2007/0236364 | A1 * | 10/2007 | Hubbard .................. | H04N 7/18 340/932.2 |
| 2012/0147585 | A1 * | 6/2012 | Girouard ................ | F21S 6/005 362/84 |

(Continued)

Primary Examiner — Matthew David Kim
(74) Attorney, Agent, or Firm — Joseph R. Kelly; Kelly, Holt & Christenson PLLC

(57) ABSTRACT

A supplemental vehicle illumination system is mounted on a structure that is received by a trailer hitch receiver on a vehicle. The supplemental illumination system receives a signal from the vehicle. This actuates a supplemental lighting system that provides additional illumination, in addition to lights disposed on the vehicle. The supplemental lighting system can also, or instead, be activated over a wireless connection.

11 Claims, 4 Drawing Sheets

(56) References Cited

U.S. PATENT DOCUMENTS

| | | | |
|---|---|---|---|
| 2013/0335987 A1* | 12/2013 | Trotter | B60Q 1/2657 |
| | | | 362/485 |
| 2015/0345736 A1* | 12/2015 | Colacilli | F21V 29/83 |
| | | | 362/6 |
| 2016/0109079 A1* | 4/2016 | McKinley | F02B 63/047 |
| | | | 362/89 |
| 2016/0167568 A1* | 6/2016 | Salami, Jr. | B60Q 1/0088 |
| | | | 362/523 |
| 2016/0347247 A1* | 12/2016 | Espey | B60Q 1/305 |
| 2017/0021940 A1* | 1/2017 | Nogales | B64D 47/04 |
| 2017/0259730 A1* | 9/2017 | Carroll | B60Q 1/245 |
| 2017/0307178 A1* | 10/2017 | Joye | F21V 14/02 |

* cited by examiner

SUPPLEMENTAL VEHICLE ILLUMINATION SYSTEM

BACKGROUND

Passenger vehicles are used in a wide variety of different ways. For instance, it is not uncommon for pickup trucks to be used to perform snow plowing and snow removal operations. Organizations that employ drivers to operate the vehicles to perform these operations often experience a relatively high degree of turnover in employees. Thus, it is not uncommon for an operator of a pickup truck, performing snow removal, to have relatively little experience. This can present difficulties.

In addition, because snow removal is often performed during inclement weather conditions, even experienced operators can inadvertently collide with objects due to road conditions, limited visibility, etc.

SUMMARY

A supplemental vehicle illumination system is mounted on a structure that is received by a trailer hitch receiver on a vehicle. The supplemental illumination system receives a signal from the vehicle. This actuates a supplemental lighting system that provides additional illumination, in addition to lights disposed on the vehicle. The supplemental lighting system can also, or instead, be actuated over a wireless connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it is not uncommon for automotive vehicles (such as passenger vehicles, e.g., pickup trucks or other passenger vehicles) to be provided with a towing package which includes a trailer hitch receiver. The towing package includes a hitch receiver that can receive items that can be used to tow a trailer. For example, the hitch receiver can receive a trailer ball that can mate with a ball hitch on a trailer so that the vehicle can tow the trailer. Also, as discussed above, operators of these types of vehicles, when performing snow removal, can find operating the vehicle difficult. This may be because of the inexperience of the operator, or it may be because of inclement weather, difficult road conditions, etc. Also, snow removal operations are often performed during the nighttime hours. The reverse lights on the vehicle can become snow covered, or can otherwise be obstructed, thus making visibility very poor when the operator is backing the vehicle.

Thus, the present description proceeds with respect to a supplemental vehicle illumination system that is mounted to a receiver hitch structure. The supplemental vehicle illumination system can include a harness assembly that can be plugged into an electrical receiver (or other connector) to receive signals from the vehicle. Those signals can include such things as a reverse signal that would otherwise turn on the reverse lights on a trailer, turn signals that would actuate the turn lights on a trailer, a brake signal that would actuate the brake lights on a trailer, among other things. The supplemental vehicle illumination system can be equipped with a camera that can communicate with an operator display, and it can be equipped with other items, such as actuators that can be used to physically extend portions of the receiver hitch structure. Similarly, the lights, actuators and camera on the supplemental vehicle illumination system can be actuated using other operator devices, such as a key fob, a mobile device (e.g., a smartphone, a tablet computer, etc.).

Figure 1:
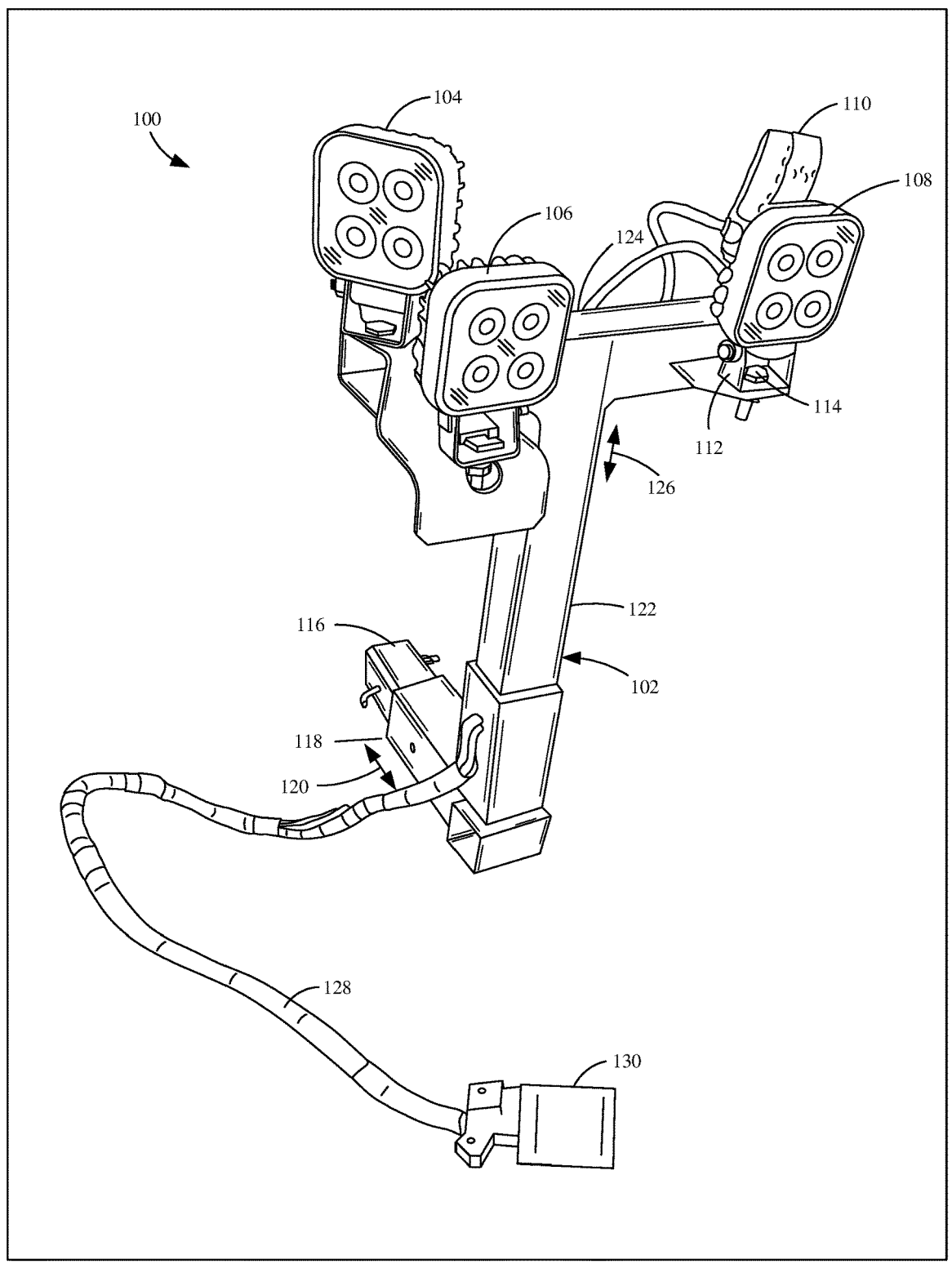
FIG. 1 is a pictorial illustration of one example of a supplemental vehicle illumination system.

FIG. 1 is a pictorial illustration of one example of a supplemental vehicle illumination system 100. Illumination system 100 illustratively includes a hitch receiver structure 102 that has a plurality of illumination sources 104, 106, 108 and 110 mounted thereto. In the example shown, illumination sources 104-110 are each mounted using a positionable mounting bracket, such as bracket 112. The bracket can be secured to structure 102 using a securing mechanism 114. The sources of illumination 104-110, when actuated (e.g., powered) emit visible electromagnetic vibration. They can be halogen lights, light emitting diodes (LEDs), or any of a wide variety of other illumination sources.

Receiver hitch support structure 102 illustratively has a receiver hitch insertion portion 116 that is received by a hitch receiver that may be mounted to a vehicle, such as a pickup truck, or another vehicle that performs snow removal or other actions. In one example, as is described in greater detail below, an extending portion 118 can be movable (e.g., telescoping) generally in the direction indicated by arrow 120. Support structure 102 also has an upwardly extending portion 122, and an illumination source support portion 124. Upwardly extending portion 122 can be movable (e.g., telescoping), also, in the direction indicated by arrow 126. Therefore, when extending portion 120 is moved in the direction indicated by arrow 120, the sources of illumination 104-110 can be moved closer to, or further from, the rear of the vehicle that is supporting them. Similarly, as portion 122 is moved in the direction indicated by arrow 126, the sources of illumination 104-110 can be moved upwardly, or downwardly, relative to the vehicle.

In the example shown in FIG. 1, the portions 116, 118, 122, and 124 can be formed of metal tubing, and metal channel pieces. They can be formed of various polymer material. They can be formed of combinations of metal and plastic or other polymer materials. They can be formed of a wide variety of different alloys, or substantially any rigid members that can be used to support sources of illumination 104-110.

Supplemental vehicle illumination system 100 also illustratively includes a wire harness 128 that connects a plurality of different conductors (e.g., wires) to the sources of illumination 104-110, and to electrical connector 130. Electrical connector 130 illustratively plugs into an electrical receiver on the vehicle so that contacts in connector 130 make contact with corresponding contacts on the receiver. Other connectors can be used as well.

In the example shown in FIG. 1, the conductors in wire harness 128 illustratively carry a power signal to provide power to the sources of illumination 104-110. The power signal can be a reverse signal that is provided by the vehicle when the vehicle is shifted into reverse.

Thus, harness assembly 128 and connector 130 are similar to those that may be found on a trailer. For instance, when the vehicle is shifted into reverse, the same signals that cause the reverse lights, on a trailer to illuminate, are received and carried by conductors in harness 128. Therefore, when the vehicle is shifted into reverse, the sources of illumination 104-110 are activated (e.g., the lights are turned on).

Figure 2:
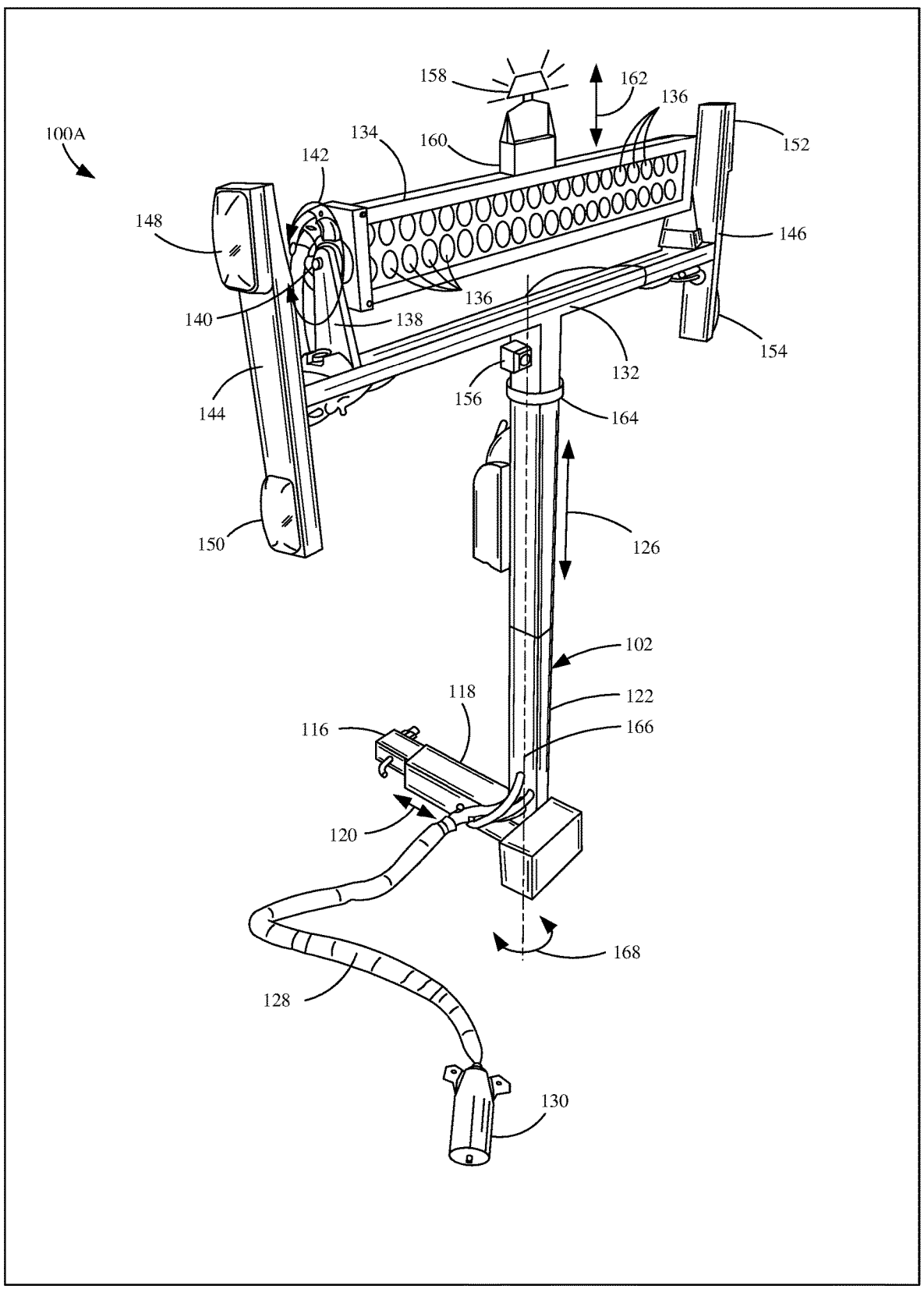
FIG. 2 is a pictorial illustration of another example of a supplemental vehicle illumination system.

FIG. 2 shows another example of a supplemental vehicle illumination system 100A. Some items are similar to those shown on system 100 in FIG. 1, and they are similarly numbered. However, FIG. 2 shows that the upwardly extending portion 122 of structure 102 supports an illumination support portion 132. Instead of a plurality of different, separately mounted, sources of illumination, FIG. 2 shows that system 100A includes an array 134 of sources of illumination 136. Therefore, when the reverse signal is received from the vehicle, the entire array 124 of sources of illumination 136 are activated and illuminated. FIG. 2 also shows that the array 134 is pivotably mounted to a bracket 138. Therefore, the array 134 can be rotated about a pivot axis 140 that corresponds to an elongate axis of array 134, generally in the direction indicated by arrow 142.

Also, as shown in FIG. 2, illumination support member 132 can have a set of side support members 144 and 146. Each of those support members support a pair of sources of illumination 148, 150, 152, and 154. The additional supplemental sources of illumination 148-150 can be activated, for example, by the brake signal and by the turn signals that are received through wire harness 128, from the vehicle. Thus, for instance, it may be that sources of illumination 148 and 152 are activated by the left and right turn signals, respectively. Similarly, it may be that sources of illumination 150 and 154 are activated by the brake signal. Other sources of illumination can be provided instead of, or in addition to, those sources 148-154. For instance, a set of running lights may be disposed on portions 144 and 146. Other sources of illumination can be provided as well.

In the example shown in FIG. 2, system 100A also includes a camera 156. Camera 156 can provide signals indicative of the optical video captured by camera 156 either through wire harness 128, or through a wireless connection. Therefore, for example, camera 156 can communicate with a display device that is carried by the operator (e.g., a mobile device carried by the operator) or to a display device in the operator compartment of the vehicle to which system 100A is mounted. The camera can be activated by the reverse signal, and used as a backup camera. In another example, it can be used as a backup camera and it can be separately activated by the operator using an actuator in the operator compartment, or a separate actuator that is carried by the operator, such as a key fob, or an actuator on a mobile device (e.g., a smartphone) carried by the operator.

In another example, any or all of the sources of illumination on system 100A (or system 100 shown in FIG. 1) can also be activated using a wireless link. For instance, they can be activated by the operator, by a device carried by the operator, by an actuator in the operator compartment, or otherwise, using Wi-Fi communication, Bluetooth communication, or another wireless communication link.

FIG. 2 also shows an example in which the supplemental sources of illumination include a beacon or strobe light 158. Beacon or strobe light 158 can be mounted to a support member 160 that is also, in one example, movable (e.g., telescoping) so that it can be moved in the direction indicated by arrows 162. As with the other sources of illumination, beacon or strobe light 158 can receive power through wire harness 128, or it can be controlled and receive power through a wireless communication link as well. In one example, support member 160 can be extended so beacon or strobe light 158 is at or above the roof level of the vehicle it is mounted to.

The movement of any or all of the members 118, 122 and 160 can be driven in a wide variety of different ways. For instance, the members can be unlocked, manually moved, and locked into place using a pin system, or using any of a wide variety of other types of locking systems. Similarly, and as is discussed in greater detail below, movement of any or all of the members 118, 122 and 162 can be driven by a motor or other actuator. Thus, the actuator can be actuated by a control signal to drive movement of those members, as desired.

Similarly, it may be that an operator has a desired configuration for system 100A. the configuration may include the lengths of telescoping movement of the various members 118, 122 and 160. In that case, an operator may have a single input mechanism that acts as a preset actuator. This allows the operator to actuate the single input mechanism and this causes all of the actuators to drive the movement of the various members so that system 100A is set to the operator's preferred configuration. These and other means of controlling system 100A are contemplated herein. Some are discussed in more detail below.

FIG. 2 also shows an example in which member 132 is coupled to member 122 by a pivot connection 164. Thus, member 132 can be pivoted about the longitudinal axis 166 of support member 122 in the direction indicated by arrow 168. The array 134 can thus be pivoted so that it sheds illumination in a primary direction toward the cab or box of the vehicle that is supporting it, instead of rearward. This may be helpful, for instance, if the operator is parked and performing some type of maintenance on the vehicle, or for other reasons. The direction of primary illumination can also be changed by pivoting array 134 about pivot point axis 140.

These pivotal connections can also have a corresponding actuator that drives the pivotal movement.

Figure 3:
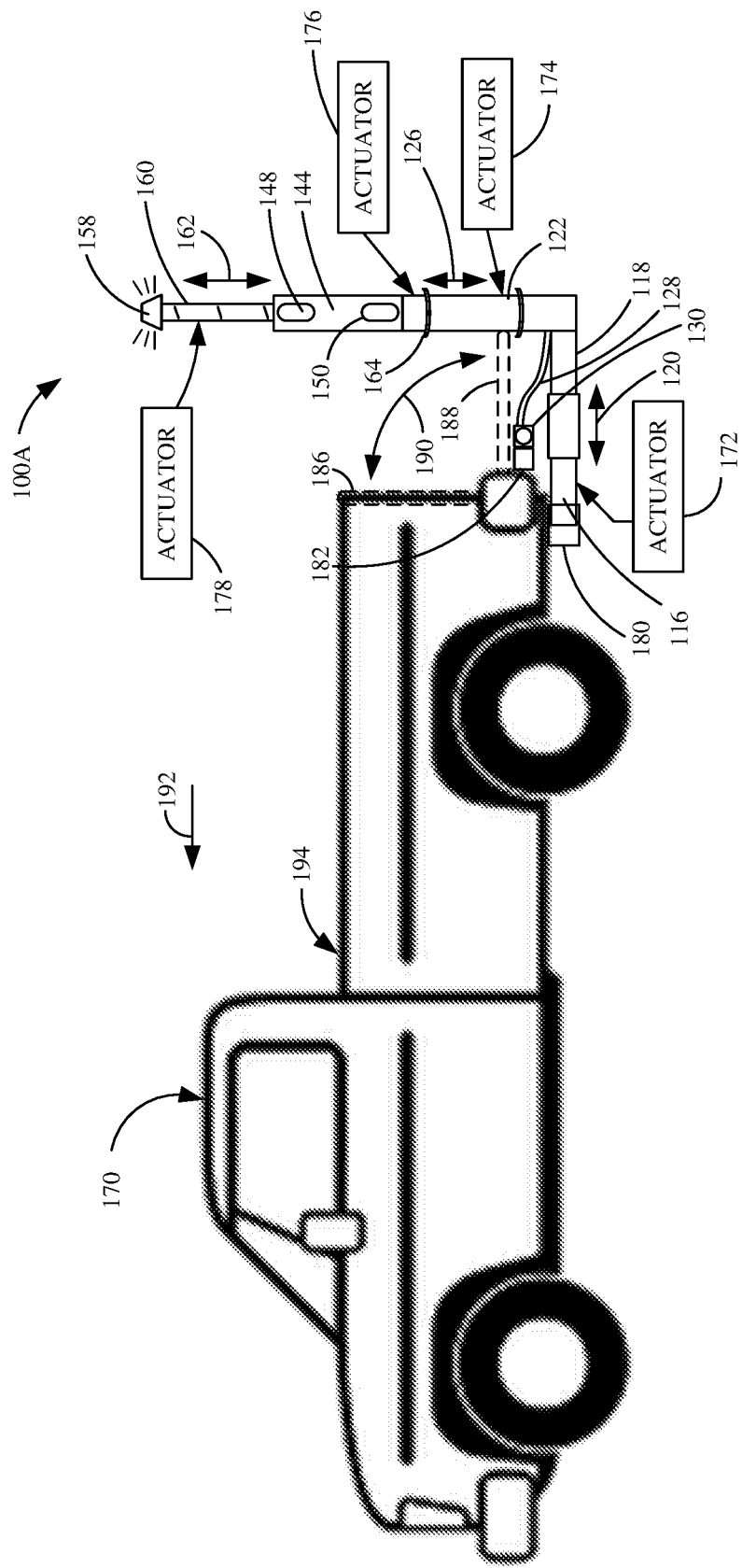
FIG. 3 is a pictorial illustration of one example of a supplemental vehicle illumination system mounted on a vehicle.

FIG. 3 is a side view of a vehicle 170 supporting the supplemental illumination system 100A. Some of the items shown in FIG. 3 are similar to those shown in FIG. 2, and they are similarly, numbered. FIG. 3 also shows a plurality of different actuators 172, 174, 176 and 178, in block diagram form. Actuator 172 can be a motor or other actuator that drives movement of member 118 in the direction indicated by arrow 120. Actuator 174 can be a motor or other actuator that drives movement of member 122 in the direction indicated by arrow 126. Actuator 176 can be a motor or other actuator that drives pivotal movement of pivotal connection 164 in the direction indicated by arrow 168 (shown in FIG. 2). Actuator 176 can be a motor or other actuator that drives movement of member 160 in the direction indicated by 162. The actuators can be electric, pneumatic, hydraulic, air over hydraulic, or other actuators.

FIG. 3 shows that vehicle 170 has a hitch receiver 180 attached thereto, along with an electrical connector (e.g., receptacle) 182. Connector 130 plugs into the electrical receptacle 182 so that wire harness 128 can carry electrical signals to the various sources of illumination, actuators, camera, etc. on system 100A. Similarly, the receiver hitch portion 168 is received in the hitch receive 180 and fastened thereto. FIG. 3 also shows that vehicle 170 can include a tailgate 186 that can move from an upward position to a lowered position 188 about an arc generally illustrated by arrow 190. In one example, movement of member 118 has sufficient range that it can move to a distance which clears the tailgate 186, when it is in the lowered position 188. Thus, the array 134 of sources of illumination 136 can be rotated to point forwardly, in the direction indicated by arrow 192, so that illumination is shed upon the tailgate in the lowered position 188 and the box 194 of vehicle 170.

Figure 4:
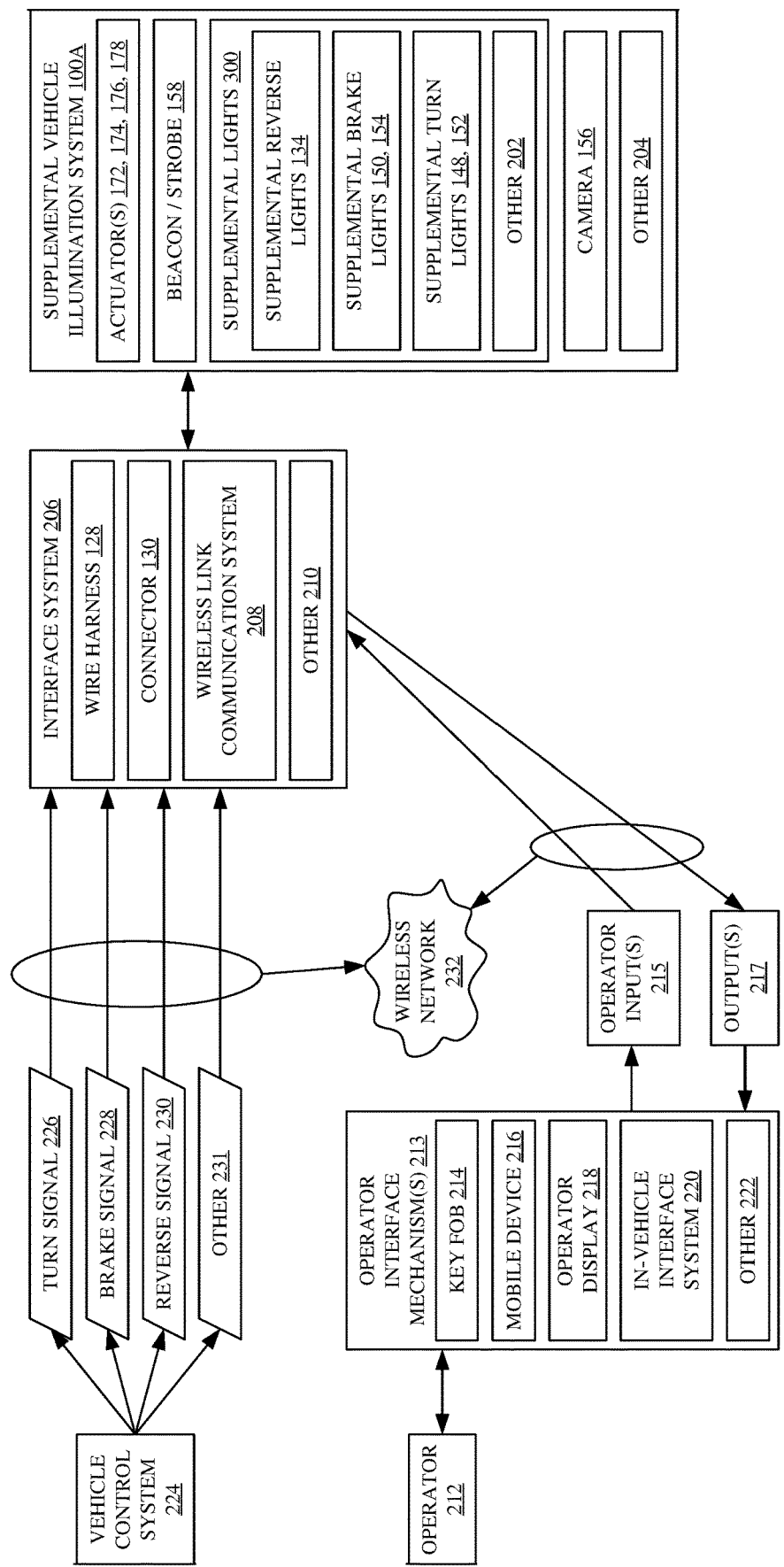
FIG. 4 is a block diagram illustrating one example of how the supplemental vehicle illumination system is controlled.

FIG. 4 is a block diagram showing one example of a system 200 that can be used to control the supplemental vehicle illumination systems 100 and 100A. In the example shown in FIG. 4, supplemental vehicle illumination system 100A is shown and described but it will be appreciated that system 100 could just as easily be used. Supplemental vehicle illumination system 100A includes actuators 172, 174, 176 and 178 (shown in FIG. 3), supplemental lights 300 that can include beacon/strobe 158, turn signal lights 148 and 152, reverse light (in the form of array 134), break lights 150 and 154 and other lights 202. Further, FIG. 4 shows that system 100A can have a camera 156 and other items 204.

FIG. 4 also shows that supplemental vehicle illumination system 100A can attach to a vehicle through interface system 206. In the examples illustrated herein, interface system 206 can include wire harness 128 and connector 130, a wireless link 208 and corresponding communication systems that allow the components of system 100A to communicate with components in the vehicle over the wireless link 208, and it can include other interface items 210. Interface system 206 thus allows the supplemental illumination system 100A to be controlled using things in the vehicle (e.g., the turn signal lever, the transmission shifting lever, the breaks, etc.) or using other things, such as a key fob 214, a smart phone 216, etc.

Therefore, in the example shown in FIG. 4, an operator 212 of vehicle 170 can provide inputs to system 200 through a wide variety of operator interface mechanisms. For instance, the operator can actuate a key fob 214, or an actuator on the operator's mobile device (e.g., smartphone) 216. The operator interface mechanisms can include a display 218 (e.g., in the vehicle or on the operator's mobile device) that displays the output from camera 156. The operator interface mechanisms can include other mechanisms provided by an in-cab interface system 220 (e.g., those on the vehicle). The operator interface mechanisms can include a wide variety of other things 222 as well. Thus, operator 212 can actuate any of the operator interface mechanisms 213 to provide operator inputs 214 to vehicle interface system 206. The operator inputs 214 can be used to control any or all of the items in supplemental vehicle illumination system 100A.

Thus, the operator can turn on the beacon/strobe 158, the various other supplemental lights 300, the camera 156, or the operator can actuate actuators 172, 174, 176, and 178, by actuating any of the operator interface mechanisms 213.

In addition, or instead, supplemental vehicle illumination system 100A can be controlled by the vehicle control system 224. That system, for instance, provides an output that is received by wire harness 128 when a turn signal 226 is turned on. It also provides a brake signal 228 when the operator applies the brakes. It can provide a reverse signal 230 when the operator shifts the transmission of the vehicle into reverse. These and other signals and inputs can be received by vehicle interface system 206 and provided to supplemental vehicle illumination system 100A, so that the various sources of illumination, actuators, camera, etc., can be controlled.

Any or all of those inputs from vehicle control system 224 or operator interface mechanisms 213 can also be provided over wireless network 232. Therefore, the operator can control the camera, for instance, or various lights, on system 100A, by actuating an operator interface mechanism 213 that communicates over wireless network 232. Vehicle control system 224 can also provide the various signals over wireless network 232. Those signals will be received through wireless link 208 where they will be applied to the correct components of system 100A.

Example 1 is a lighting system, comprising:
a receiver hitch structure having a receiver hitch portion that fits into a hitch receiver on a vehicle, an illumination source support portion and an elongate support portion extending between the receiver hitch portion and the illumination source support portion;
a source of illumination coupled to the illumination source support portion;
a connector that connects with a vehicle connector on the vehicle; and
a conductor connected between the connector and the source of illumination to provide power to the source of illumination.

Example 2 is the lighting system of any or all previous examples wherein the connector is configured to connect to the vehicle connector to receive an actuation signal from the vehicle when a transmission of the vehicle is in reverse, the source of illumination emitting visible electromagnetic radiation based on the actuation signal.

Example 3 is the lighting system of any or all previous examples wherein the elongate support portion comprises:
a first elongate support portion having a first end and a second end; and
a second elongate support portion having a first end and a second end, the first end of the first elongate support portion being coupled to the receiver hitch portion and the second end of the first elongate support portion being coupled to the first end of the second elongate support portion, the second end of the second elongate support portion being coupled to the illumination source support portion.

Example 4 is the lighting system of any or all previous examples wherein the first elongate support portion is extendable and contractable to change a distance between the first and second ends thereof.

Example 5 is the lighting system of any or all previous examples and further comprising:
an actuator that drives extension and retraction to change the distance between the first and second ends of the first elongate support portion.

Example 6 is the lighting system of any or all previous examples wherein the first elongate support portion has a plurality of sections telescopically connected to one another.

Example 7 is the lighting system of any or all previous examples and further comprising:
a locking system configured to lock the plurality of sections of the first elongate support portion relative to one another, in a selected one of a plurality of different, selectable, telescoped positions.

Example 8 is the lighting system of any or all previous examples wherein the second elongate support portion is extendable and contractable to change a distance between the first and second ends thereof.

Example 9 is the lighting system of any or all previous examples and further comprising:

an actuator that drives extension and retraction to change the distance between the first and second ends of the second elongate support portion.

Example 10 is the lighting system of any or all previous examples wherein the second elongate support portion has a plurality of sections telescopically connected to one another.

Example 11 is the lighting system of any or all previous examples and further comprising:

a locking system configured to lock the plurality of sections of the second elongate support portion relative to one another, in a selected one of a plurality of different, selectable, telescoped positions.

Example 12 is the lighting system of any or all previous examples and further comprising:

a beacon; and a beacon support portion that has a first end that supports the beacon and a second end coupled to the receiver hitch structure.

Example 13 is the lighting system of any or all previous examples wherein the beacon support portion is movable to change a distance between the first and second ends thereof.

Example 14 is the lighting system of any or all previous examples and further comprising:

an actuator that drives movement of the beacon support portion to change the distance between the first and second ends of the beacon support portion.

Example 15 is the lighting system of any or all previous examples wherein the receiver hitch structure comprises:

a pivotal link configured to change a primary direction of emanation of visible electro-magnetic radiation emitted by the source of illumination between a first direction facing toward the vehicle and a second direction facing away from the vehicle.

Example 16 is the lighting system of any or all previous examples and further comprising:

a wireless switch configured to receive a wireless control signal, from a wireless communication device, to control the source of illumination.

Example 17 is the lighting system of any or all previous examples wherein the wireless switch is configured to receive the wireless control signal from at least one of a key fob or a mobile device.

Example 18 is the lighting system of any or all previous examples and further comprising:

a camera mounted to the receiver hitch structure configured to communicate a video signal to an operator interface mechanism.

Example 19 is the lighting system of any or all previous examples wherein the camera is configured to communicate the video signal to the operator interface mechanism over a wireless link.

Example 20 is a supplemental vehicle lighting system, comprising:

a receiver hitch structure having a receiver hitch portion, that fits into a hitch receiver on a vehicle and extends rearwardly of the vehicle, an illumination source support portion and an elongate support portion extending upwardly, when mounted to the vehicle, between the receiver hitch portion and the illumination source support portion;

a source of illumination coupled to the illumination source support portion;

a connector that connects to a vehicle connector on the vehicle; and a conductor connected between the connector and the source of illumination to provide power to the source of illumination, the connector being configured to receive an actuation signal from the vehicle when a transmission of the vehicle is in reverse, the source of illumination emitting visible electromagnetic radiation based on the actuation signal.

Although the present invention has been described with reference to preferred embodiments, workers skilled in the art will recognize that changes may be made in form and detail without departing from the spirit and scope of the invention.

What is claimed is:

1. A lighting system, comprising:
a receiver hitch structure having a receiver hitch portion that fits into a hitch receiver on a vehicle, an illumination source support portion and an elongate support portion extending between the receiver hitch portion and the illumination source support portion, wherein the elongate support portion comprises;
a first elongate support portion having a first end and a second end, the first elongate support portion being extendable and contractable to change a distance between the first and second ends thereof; and
a second elongate support portion having a first end and a second end, the first end of the first elongate support portion being coupled to the receiver hitch portion and the second end of the first elongate support portion being coupled to the first end of the second elongate support portion, the second end of the second elongate support portion being coupled to the illumination source support portion, the second elongate support being extendable and contractable to change a distance between the first and second ends thereof;
a plurality of illumination sources coupled to the illumination source support portion;
a connector that connects with a vehicle connector on the vehicle;
a conductor connected between the connector and the plurality of illumination sources to provide power to the plurality of illumination sources; and
a positionable bracket secured to each of the plurality of illumination sources and the illumination support portion, configured to pivotably mount the plurality of illumination sources such that each illumination source of the plurality of illumination sources is disposed substantially horizontally relative to each other respective illumination source of the plurality of illumination sources and may be individually rotated about the positionable bracket in a first pivot axis in a vertical direction and about the illumination support portion in a second pivot axis in a horizontal direction to change a primary direction of emanation of visible electromagnetic radiation emitted by each of the plurality of illumination sources.

2. The lighting system of claim 1 wherein the connector is configured to connect to the vehicle connector to receive an actuation signal from the vehicle when a transmission of the vehicle is in reverse, the plurality of illumination sources emitting visible electromagnetic radiation based on the actuation signal.

3. The lighting system of claim 1 wherein the first elongate support portion has a plurality of sections telescopically connected to one another.

4. The lighting system of claim 3 and further comprising:
a locking system configured to lock the plurality of sections of the first elongate support portion relative to one another, in a selected one of a plurality of different, selectable, telescoped positions.

5. The lighting system of claim 1, and further comprising:
an actuator that drives extension and retraction to change the distance between the first and second ends of the second elongate support portion.

6. The lighting system of claim 1 wherein the second elongate support portion has a plurality of sections telescopically connected to one another.

7. The lighting system of claim 6 and further comprising:
a locking system configured to lock the plurality of sections of the second elongate support portion relative to one another, in a selected one of a plurality of different, selectable, telescoped positions.

8. The lighting system of claim 1 and further comprising:
a wireless switch configured to receive a wireless control signal, from a wireless communication device, to control the plurality of illumination sources.

9. The lighting system of claim 8 wherein the wireless switch is configured to receive the wireless control signal from at least one of a key fob or a mobile device.

10. The lighting system of claim 1 and further comprising:
a camera mounted to the receiver hitch structure configured to communicate a video signal to an operator interface mechanism.

11. The lighting system of claim 10 wherein the camera is configured to communicate the video signal to the operator interface mechanism over a wireless link.

* * * * *